United States Patent [19]

Masterson

[11] 3,952,483
[45] Apr. 27, 1976

[54] TRIMMER WITH LATERALLY POSITIONED BLADE AND SEPARATELY ADJUSTABLE FRONT AND REAR WHEELS

[76] Inventor: Dean H. Masterson, R.R. No. 5, Box 467, LaPorte, Ind. 46350

[22] Filed: Mar. 1, 1974

[21] Appl. No.: 447,069

[52] U.S. Cl. ............................. 56/17.2; 56/255
[51] Int. Cl.² ................................ A01D 35/262
[58] Field of Search ............ 56/16.7, 17.1, 17.2, 56/255

[56] References Cited
UNITED STATES PATENTS

| | | | |
|---|---|---|---|
| 2,658,320 | 11/1953 | Gelinas | 56/16.7 |
| 2,673,366 | 3/1954 | Johnson | 56/16.7 UX |
| 2,746,227 | 5/1956 | Tower | 56/255 X |
| 2,948,544 | 8/1960 | Rowe et al. | 56/17.2 X |
| 3,141,283 | 7/1964 | Swindler | 56/17.2 |
| 3,152,431 | 10/1964 | Ott et al. | 56/17.1 X |
| 3,161,006 | 12/1964 | Willette et al. | 56/17.2 X |
| 3,183,651 | 5/1965 | Hoefler | 56/16.7 UX |

FOREIGN PATENTS OR APPLICATIONS

| | | | |
|---|---|---|---|
| 671,157 | 9/1963 | Canada | 56/255 |
| 919,689 | 2/1963 | United Kingdom | 56/255 |

*Primary Examiner*—F. Barry Shay
*Attorney, Agent, or Firm*—Marmaduke Hobbs

[57] ABSTRACT

A lawn trimmer in which a trimming blade is disposed laterally from the trimmer body and is adjustable vertically by adjusting the main frame of the trimmer relative to the front and rear axles. Four wheels are preferably provided on the trimmer and the two front wheels are of the caster type. A motor is mounted on the main frame and a power transmission means interconnects the rotary blade with the motor, and a shield encloses the rotary blade. The lateral positioning of the blade in combination with the caster front wheels gives the trimmer good mobility and maneuverability for trimming in close places.

5 Claims, 6 Drawing Figures

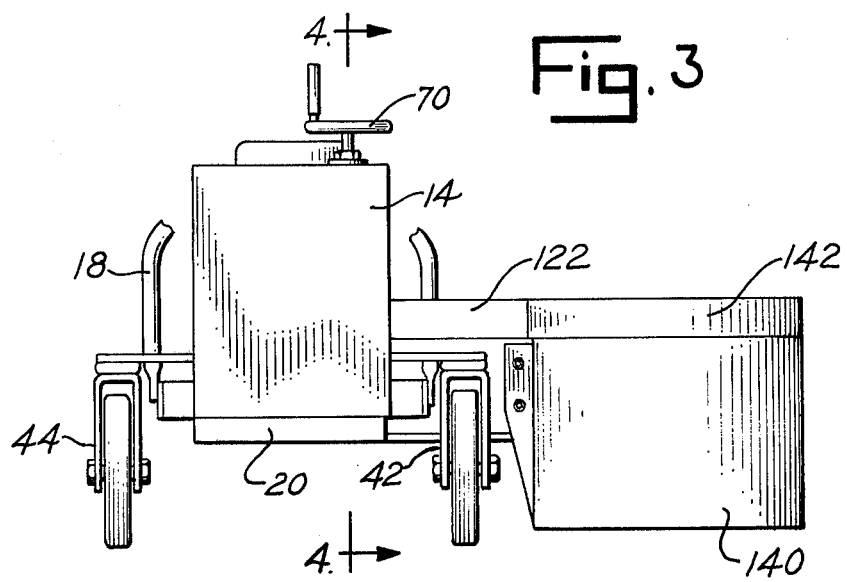
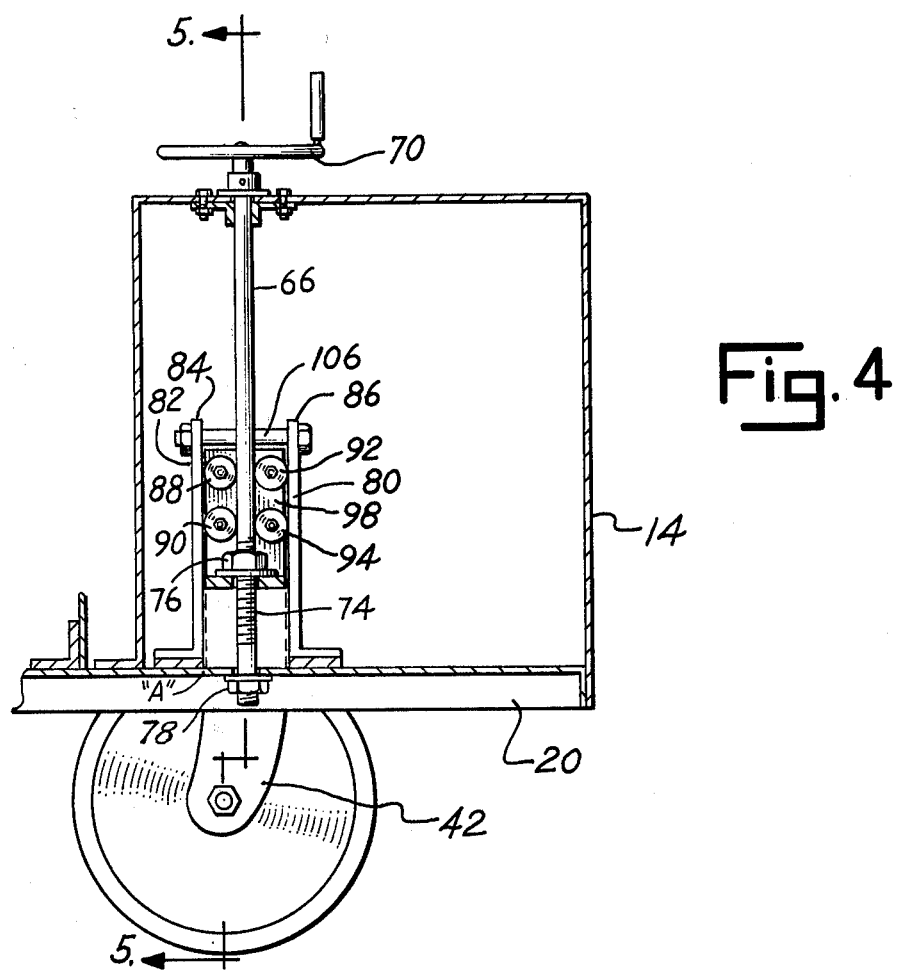

TRIMMER WITH LATERALLY POSITIONED BLADE AND SEPARATELY ADJUSTABLE FRONT AND REAR WHEELS

Most lawn mowers will not cut the grass close enough to walls, trees, shrubs, fences and other upright objects and structures to eliminate the need for extensive hand trimming after the lawn has been mowed. Attempts have been made to provide trimmer attachments on lawn mowers, but these are usually unsatisfactory in that they interfere with the operation and maneuverability of the mower while it is being used to mow the lawn, and often make it difficult to maneuver the trimming cutters into the desired location for effective trimming. Further, adjusting the cutting blades to the required height for the most effective cutting and lawn grooming is frequently difficult, if not impossible. Consequently, after the power trimming has been completed with these prior machines, a substantial amount of manual trimming is still required to complete the lawn care chores. It is therefore one of the principal objects of the present invention to provide a lawn trimmer which can be readily maneuvered into close places for effective cutting, and which can be easily adjusted to give the optimum cutting height and even appearance with the remainder of the mowed lawn.

Another object of the invention is to provide a wheel mounted lawn trimming mechanism which will trim grass and other growth close to walls, tree trunks, fences and similar vertical objects, and which can be operated with ease to cut growth in difficult to reach places without interference from the wheels and without damaging the objects along where grass is being cut.

Still another object of the invention is to provide a power lawn trimming machine which is safe and easy to operate, and which can be maintained in optimum operating condition with little service or attention, but can be easily serviced when required.

A further object is to provide a lawn trimming mechanism which can be operated as a separate unit with its own carriage, or can be mounted on and driven by the motor of a conventional rotary lawn mower, and which is relatively simple in construction and operation.

Additional objects and advantages of the present invention will become apparent from the following description and accompanying drawings, wherein:

FIG. 3 is a front elevational view of the lawn trimmer;

FIG. 4 is a fragmentary vertical cross sectional view of the lawn trimmer shown in the preceding figures, the section being taken on line 4 — 4 of FIG. 3;

Figure 1:
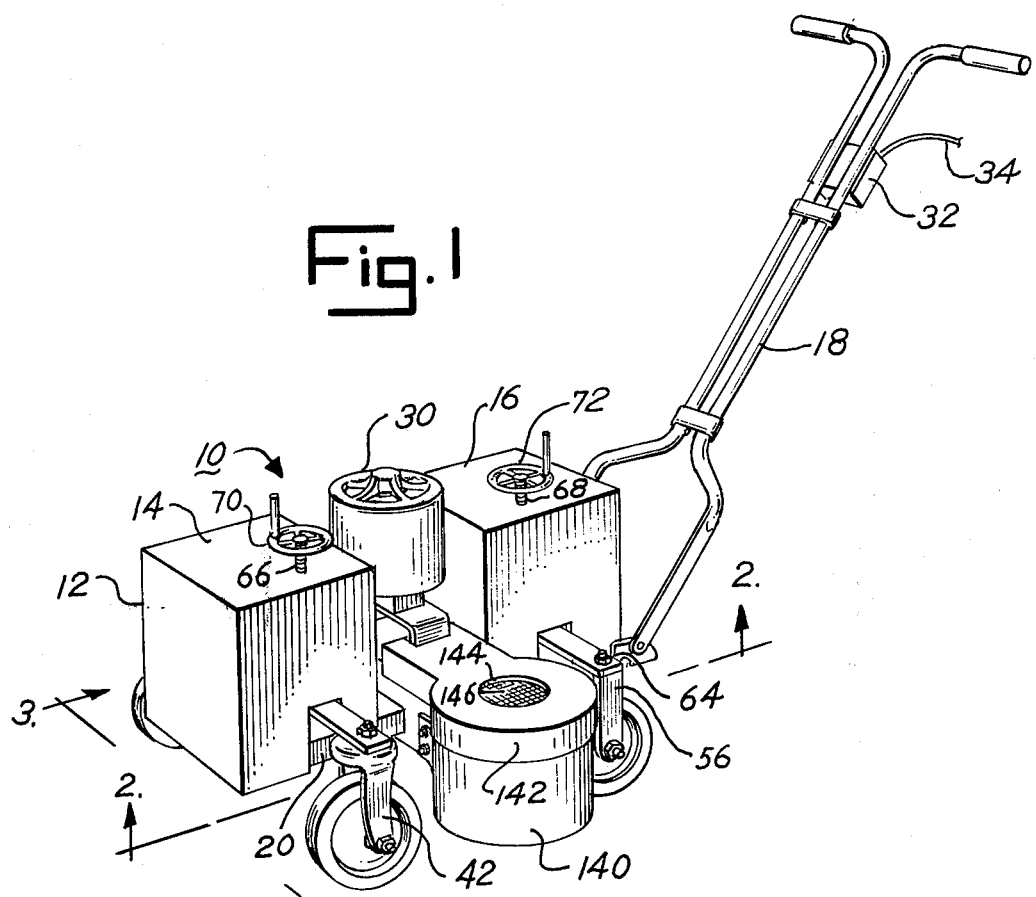
FIG. 1 is a perspective view of a lawn trimmer embodying the present invention.
Figure 2:
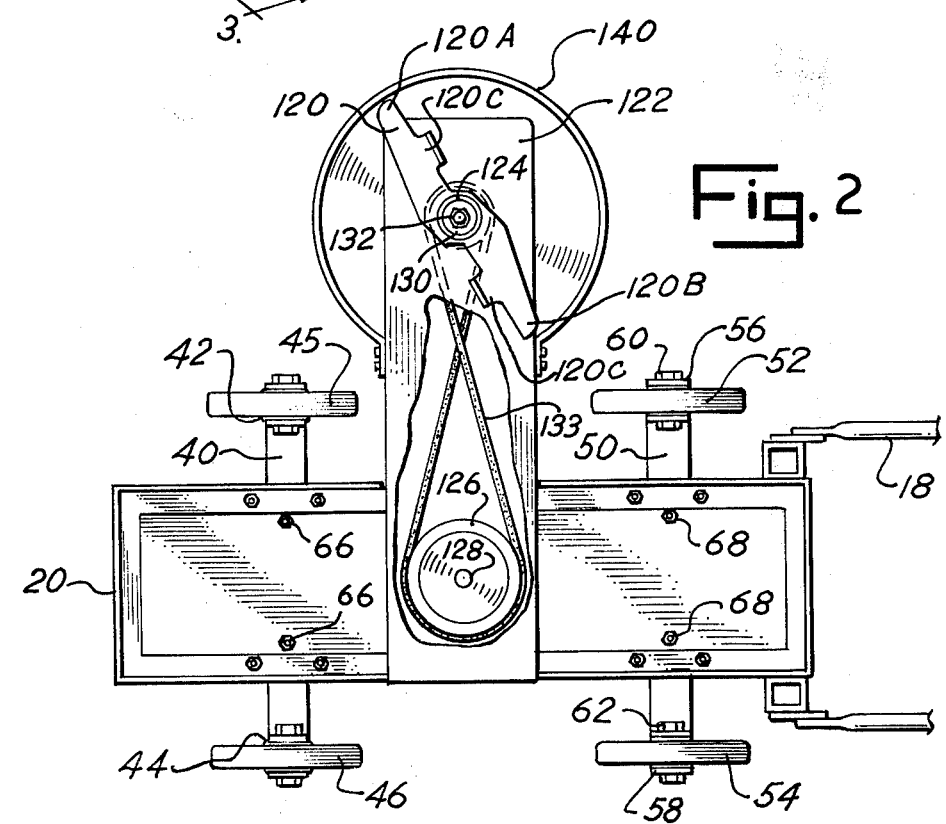
FIG. 2 is a bottom view of the lawn trimmer shown in FIG. 1.
Figure 5:
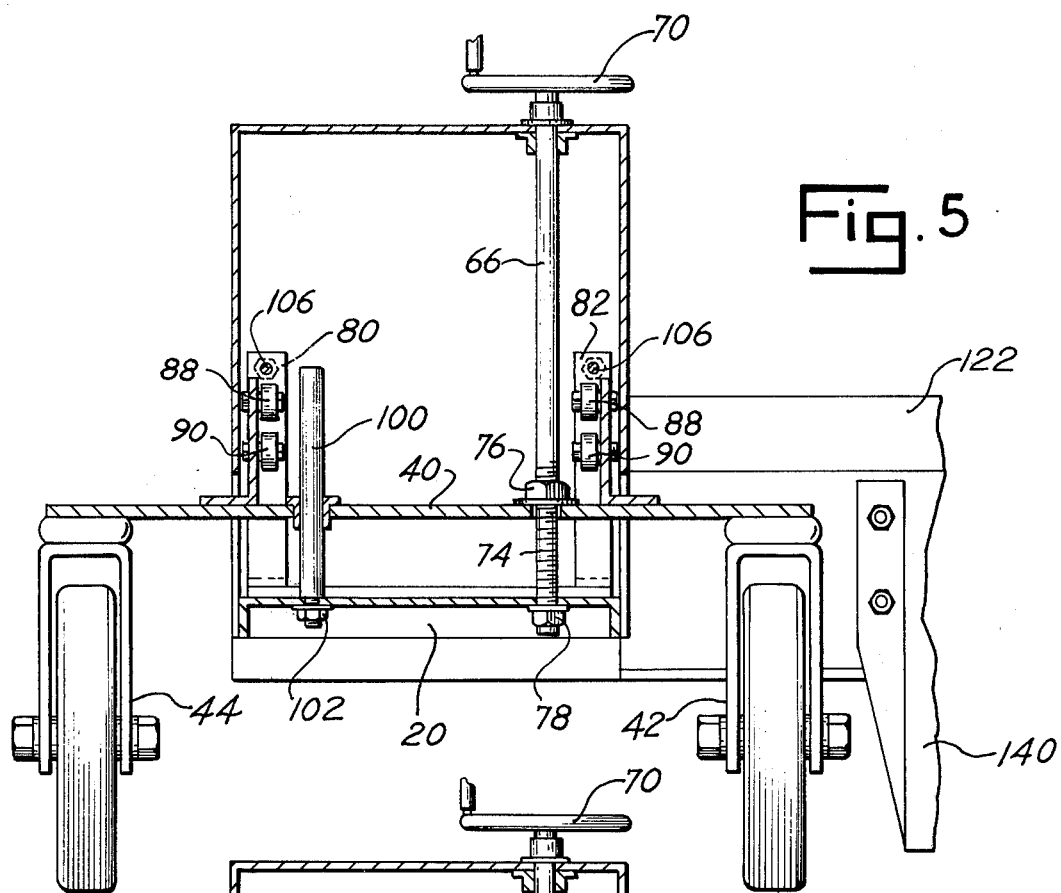
FIG. 5 is a transverse cross sectional view of the lawn trimmer, the section being taken on line 5 — 5 of FIG. 4.
Figure 6:
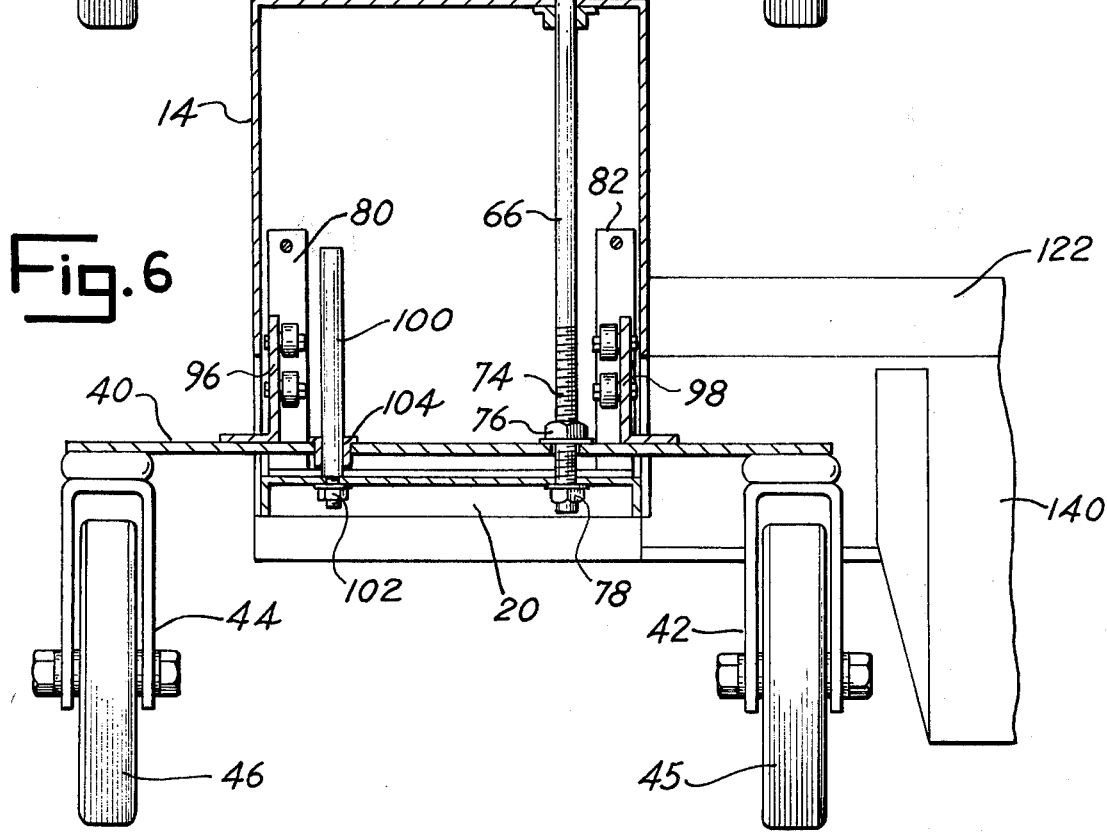
FIG. 6 is a vertical cross sectional view similar to the cross sectional view shown in FIG. 5, but showing the trimmer in an adjusted position different from that in FIG. 5.

Referring more specifically to the drawings, and to FIG. 1 in particular, numeral 10 indicates generally a trimming apparatus embodying the present invention and having a body 12, housing sections 14 and 16, and handle 18. A frame 20 supports the two housing sections, and the handle is connected to one end of the frame. The particular design or shape of the trimmer is not critical, and the housing sections may be of different shapes or may be made all in one unit, as will be more fully seen hereinafter. The size of the unit may be varied to satisfy requirements, and may be driven either by an electric motor such as that shown at numeral 30, or by a gasoline engine if desired. The motor is controlled through a control switch 32 on handle 18, and an extension power cord 34 is connected to a suitable electrical source and is wired through or along the handle to motor 30.

Frame 20 is mounted on an undercarriage consisting of a front cross member 40 having casters 42 and 44 pivotally mounted on the outer ends thereof, the two casters pivoting easily as the forward end is moved from side to side to permit the wheels 45 and 46 thereof to roll freely in the direction in which the forward end of the trimmer is being moved. The rear end of the frame is supported by rear cross member 50 having wheels 52 and 54 mounted on brackets 56 and 58. The two brackets include bolts or shafts 60 and 62, respectively, forming axles for the two wheels, and brackets 56 and 58 are rigidly secured to cross member 50 by bolts 64 at each end of the cross member.

The frame is adjusted upwardly and downwardly by an adjustment mechanism consisting of vertical rods 66 and 68 for the front and rear cross members, respectively, rotated by hand wheels 70 and 72. The lower end of each of the rods is threaded, as at numeral 74 and threaded through a nut 76. The shaft is held in place in the sections by a nut 78 on the lower end of each of the rods. Rotation of the shaft causes the rod to move upwardly or downwardly in nut 76 and thereby adjusts frame 20 upwardly or downwardly with respect to the cross members. The frame is guided in its upward and downward movement by fixtures 80 and 82, each consisting of upstanding brackets 84 and 86 forming tracks for rollers 88 and 90 and 92 and 94. The rollers are mounted rigidly on upstanding members 96 and 98 secured to the opposite ends of the respective cross members. As the frame moves upwardly and downwardly when shaft 66 is rotated, the rollers rolling on upstanding members 84 and 86 retain the frame and cross member in proper operating relationship. The cross member is also guided by a shaft 100 secured to the lower part of the housing by a nut 102 and extending upwardly through an opening 104 in the bottom of the frame. Nut 76 is secured to the respective cross members so that it will not rotate and will assist in giving substantial rigidity to the respective cross member. The lower ends of brackets 84 and 86 are joined rigidly to the frame and are connected to one another at the top by a bolt 106, and they move freely upwardly and downwardly on either side of members 96 and 98. Thus it is seen that the frame can be readily adjusted upwardly and downwardly with respect to the cross member by merely rotating either the front or rear hand wheels 70 and 72.

A trimmer cutter blade 120 is mounted laterally from the main frame 20 of the machine on a frame 122, which supports a bearing shaft assembly 124 for the blade. The blade is driven by motor 30 through pulley 126 on shaft 128 of the motor and pulley 130 on shaft 132 of the bearing assembly 124, and by a belt 133 trained on the two pulleys. Frame 122 as shown in the drawings is constructed of sheet or plate metal, and is hollow to provide an enclosure for the belt. The blade 120 has two sections 120A and 120B, and each is provided with a vacuum creating vane 120C for creating an air flow which assists in uprighting the grass for effective cutting and for drawing or pulling the grass inwardly and upwardly toward the blade. The blade is preferably enclosed in a cylindrically shaped shield 140 surrounding the greater part of the area in which the blade rotates and supported by frame 122. A cover 142 preferably encloses frame 122 and shield 140, thereby fully enclosing the area in which the blade operates. An opening 144 with a grill 146 is preferably provided in cover 142 to obtain maximum flow of air under the shield to obtain the most effective action of the vacuum vanes 120C.

In the operation of the present lawn trimmer, the operator first adjusts the frame 20 relative to both the front and rear cross members 40 and 50 to provide the desired height of blade 120 above the ground. This determines the height at which the grass will be cut. After the adjustment is made, the motor 30 is started, thus rotating cutting blade 120 within shield 140. While the motor is running and the cutting blade is rotating, the operator maneuvers the trimmer along a fence, wall, tree or shrub to cut the grass in close proximity thereto. In view of the laterally disposed position of the cutting blade and the caster arrangement of the front wheels, the trimmer is easily maneuvered into effective cutting position in areas of limited space. While a small distance may be present between the cutting ends of the blade 120 and the wall or fence, the vacuum created by vanes 120C effectively draws the grass and other growth inwardly so that trimming is completed by the machine with no appreciable manual operation being required wherever the cutting blade of the machine can be maneuvered.

It is seen that the cutting blade of the trimmer can be precisely adjusted to any desired height to conform to the height of the grass cut by the conventional mower on the remainder of the lawn, and the laterally extending position of the blade, coupled with the caster arrangement of the front wheels, facilitates the maneuvering of the trimmer into close places where effective cutting can be accomplished. While the trimmer mechanism can be adapted to a conventional mower, redesigning of the mower would be required to incorporate the advantages of the precise adjustment of the height of the blade above the ground and the incorporation of the casters which permit the laterally extending blade effectively to reach the area to be trimmed. The cuttings from the trimming may be confined to the area within the shield, where they would be virtually disintegrated by the blades, or they may be discharged through an opening in the lower part of the shield, preferably through an opening located on the inner side of the shield.

While only one embodiment of the lawn trimmer has been described in detail herein, various changes and modifications may be made without departing from the scope of the invention.

I claim:

1. A lawn trimmer comprising a frame having a lateral extension on only one side, forward and rearward wheel means supporting said frame above the ground and being disposed forwardly and rearwardly of said frame extension, said forward wheel means including a transversely disposed cross member and a caster mounted on each end of said member and said rearward wheel means including a transversely disposed cross member and a wheel mounted on each end of said member, a rotary blade mounted on said frame extension near the outer end thereof for rotation on a substantially horizontal plane and being disposed principally laterally outwardly from each wheel means, a motor on said frame, power transmission means interconnecting said motor and blade, an adjustment means for said forward and rearward wheel means for adjusting the said frame vertically relative to said wheel means and said blade relative to the ground, each said adjustment means including a vertically extending screw rotatably secured to said frame, a nut fixed to the respective one of said members, said screw and nut being threadedly connected, and means for manually rotating said screw, whereby said frame may be vertically adjusted by rotating said screws.

2. A lawn trimmer as defined in claim 1 in which said power transmission means consists of a pulley on said motor, a shaft and pulley for said blade, and a flexible driving means trained on said pulleys.

3. A lawn trimmer as defined in claim 1 in which said blade is spaced laterally outwardly from the wheel means.

4. A lawn trimmer as defined in claim 1 in which said blade is spaced laterally outwardly from the wheel means on the side of the trimmer on which the blade is disposed.

5. A lawn trimmer as defined in claim 4 in which a shield of a cylindrical shape substantially encloses the rotary blade and is supported by said frame.

* * * * *